United States Patent [19]
Schedrat et al.

[11] Patent Number: 5,493,920
[45] Date of Patent: Feb. 27, 1996

[54] ARRANGEMENT OF MEASURING DEVICES ON A SEMITRAILER MOTOR VEHICLE

[75] Inventors: Kurt Schedrat, Gaienhofen; Lothar Jakob, Blumberg; Dirk Engels, Tengen, all of Germany

[73] Assignee: Georg Fischer Verkehrstechnik GmbH, Singen, Germany

[21] Appl. No.: 197,214

[22] Filed: Feb. 16, 1994

[30] Foreign Application Priority Data

Feb. 17, 1993 [CH] Switzerland .................. 491/93

[51] Int. Cl.⁶ .................. G01L 5/16; G01G 19/08
[52] U.S. Cl. .................. 73/862.57; 73/862.045; 73/862.541; 177/136; 177/211
[58] Field of Search .................. 73/862.03, 862.041, 73/862.045, 862.541, 862.57, 862.381, 862.632, 862.628; 177/136, 211

[56] References Cited

U.S. PATENT DOCUMENTS

| | | | |
|---|---|---|---|
| 3,603,418 | 9/1971 | Schmidt et al. | 73/862.628 |
| 3,661,220 | 5/1972 | Harris | 73/862.632 |
| 3,854,540 | 12/1974 | Holmstrom, Jr. | 73/862.045 |
| 3,857,452 | 12/1974 | Hartman | 73/862.541 |
| 4,319,766 | 3/1982 | Corteg et al. | 73/862.57 |
| 4,492,280 | 1/1985 | Susor | 73/862.628 |
| 4,573,362 | 3/1986 | Amlani | 73/862.045 |
| 4,635,479 | 1/1987 | Salisbury, Jr. et al. | 73/862.045 |
| 4,666,003 | 5/1987 | Reichow | 73/862.632 |
| 4,864,874 | 9/1989 | Häfner | 73/862.57 |
| 4,974,454 | 12/1990 | Wolfer et al. | 73/862.541 |

FOREIGN PATENT DOCUMENTS

| | | | |
|---|---|---|---|
| 0302437 | 2/1989 | European Pat. Off. | 73/862.57 |
| 2206647A | 10/1972 | Germany | 73/862.541 |
| 2094984 | 9/1982 | United Kingdom | 73/862.57 |

*Primary Examiner*—Hezron E. Williams
*Assistant Examiner*—G. Dombroske
*Attorney, Agent, or Firm*—Bachman & LaPointe

[57] ABSTRACT

The present invention relates to an arrangement of measuring devices on a semitrailer motor vehicle having a tractive unit, a semitrailer unit and a fifth wheel fastened to the tractive unit. An intermediate plate is disposed between the fifth wheel, the tractive unit and the semitrailer and is connected to the semitrailer. Measuring devices are disposed on the intermediate plate for measuring acceleration, tractive or braking forces and for measuring the weight of the semitrailer. The measured values are used to influence and improve the driving behavior of the semitrailer motor vehicle.

5 Claims, 1 Drawing Sheet

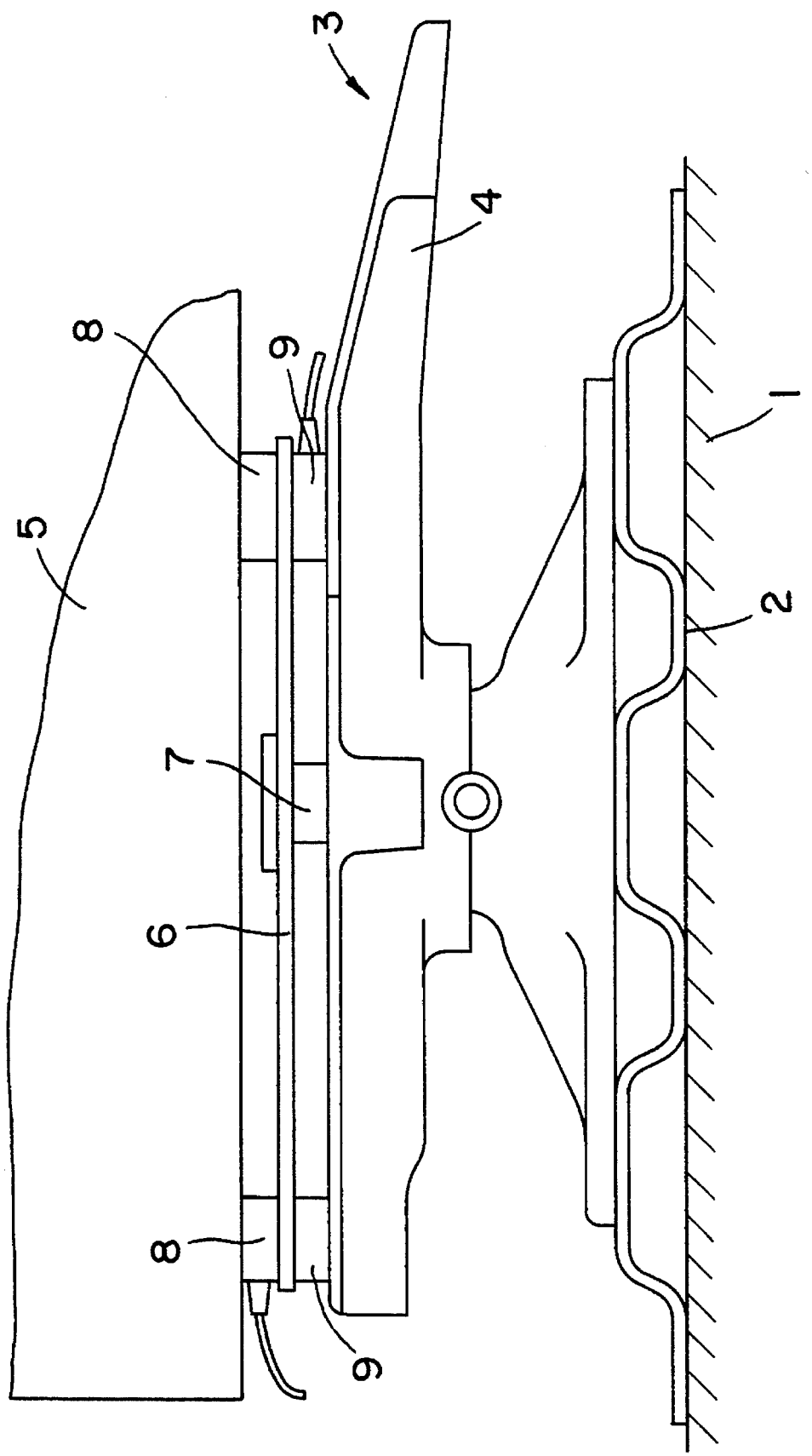

18
ARRANGEMENT OF MEASURING DEVICES ON A SEMITRAILER MOTOR VEHICLE

BACKGROUND OF THE INVENTION

The present invention relates to an arrangement of measuring devices on a semitrailer motor vehicle having a tractive unit, a semitrailer and a fifth wheel fastened to the tractive unit for measuring acceleration, tractive or braking forces and/or the weight of the semitrailer.

It is a known practice to provide semitrailer motor vehicles having fifth wheels with measuring devices for measuring the wear on certain parts. This is done so that reliable operation may be guaranteed through early replacement of worn parts.

From a safety standpoint, it is also desirable to measure certain forces such as acceleration, tractive or braking forces and the weight of the semitrailer to influence and improve the driving behavior of the semitrailer motor vehicle.

Accordingly, it is a principal object of the present invention to provide an arrangement of measuring devices by means of which an influencing and improvement of the driving behavior of the semitrailer motor vehicle can be achieved for different loads.

Further objects and advantages of the present invention will appear hereinbelow.

SUMMARY OF THE INVENTION

The present invention relates to an arrangement of measuring devices on a semitrailer motor vehicle for influencing and improving the driving behavior of the vehicle.

In accordance with the present invention, an arrangement of measuring devices is provided on a semitrailer motor vehicle having a tractive unit, a semitrailer, and a fifth wheel fastened to the tractive unit. The measuring arrangement comprises means for measuring forces which arise between the semitrailer and the tractive unit. The measuring means are disposed between the semitrailer and the fifth wheel. The arrangement further includes a plate connected to the semitrailer and positioned intermediate the semitrailer and the fifth wheel. The measuring means are disposed on this intermediate plate. In a preferred embodiment of the present invention, the measuring means includes means for measuring at least one of acceleration, tractive and braking forces at the intermediate plate. Additionally, the measuring means include means for measuring the weight of the semitrailer. Other details of the measuring arrangement of the present invention are set out in the following description and the accompanying drawing. The specific measuring arrangement of the present invention is advantageous in that it provides information which influences the driving behavior of the vehicle.

BRIEF DESCRIPTION OF THE DRAWING

The figure shows a detailed plan view of the measuring arrangement of the present invention.

DETAILED DESCRIPTION

The figure illustrates a measuring arrangement for a semitrailer motor vehicle having a tractive unit 1, a semitrailer 5, and a fifth wheel 3. The fifth wheel 3 is firmly connected to the tractive unit 1 by means of a mounting plate 2. As shown in the figure, the fifth wheel 3 includes a coupling plate 4 connected to the mounting plate 2. Any suitable means known in the art may be used to connect the coupling plate 4 to the mounting plate 2.

An intermediate plate 6 is disposed between the coupling plate 4 of the fifth wheel 3 and the semitrailer 5. The plate 6 is connected to the semitrailer 5 by suitable means (not shown) known in the art. Coupling of the semitrailer 5 to the tractive unit 1 is effected by a fifth-wheel kingpin 7 which is fastened to the intermediate plate 6. The kingpin 7 engages a recess (not shown) in the coupling plate 4 of the fifth wheel 3.

As previously mentioned, the present invention includes an arrangement of measuring devices by means of which an influencing and improvement of the driving behavior of the vehicle can be achieved under different load conditions. This measuring arrangement includes a first arrangement of measuring devices 8 disposed between a surface of the semitrailer 5 and a first surface of the intermediate plate 6. While the figure illustrates the first arrangement as having two measuring devices, it should be recognized that the first measuring arrangement could be formed by only one measuring device or alternatively by more than two measuring devices. The measuring arrangement as shown in the figure further includes a second arrangement of measuring devices 9 disposed between a second surface of the intermediate plate opposed to the first surface and the coupling plate 4. While the figure illustrates the second arrangement as having two measuring devices, it should be recognized that the second arrangement too could be formed by a single measuring device or alternatively by more than two measuring devices. In a preferred embodiment of the present invention, the measuring devices 8 and 9 are disposed on plate 6. They may be mounted to or connected to the plate 6 using any suitable means (not shown) known in the art.

In a preferred embodiment of the present invention, the measuring devices 8 measure horizontal forces exerted by acceleration, tractive or braking forces acting on the semitrailer motor vehicle at the plate 6, while measuring devices 9 are used to measure the weight of the semitrailer. Preferably, the measuring devices 8 and the measuring devices 9 are in the form of force sensors. It should be noted that the measuring devices 8 and 9 may be any suitable force sensor known in the art. All of the values measured by devices 8 and 9 are supplied to an evaluation device (not shown) by means of which the driving behavior of the vehicle may be influenced and improved.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An arrangement of measuring devices on a semitrailer motor vehicle having a tractive unit, a semitrailer, a fifth wheel fastened to the tractive unit, and a plate connected to the semitrailer and positioned intermediate said semitrailer and said fifth wheel, said measuring arrangement comprising:

means for measuring forces which arise between the semitrailer and the tractive unit; and said measuring means being disposed on said plate between the semitrailer and the fifth wheel, said measuring means includes a first means for measuring at least one of acceleration, tractive and braking forces at said plate and second means for measuring the weight of the semitrailer and wherein said first means are positioned between a first surface of said plate and a surface of said semitrailer and said second means are positioned between a second surface of said plate and a coupling plate of the fifth wheel.

2. An arrangement according to claim 1 wherein said first and second surfaces are opposed surfaces of said plate.

3. An arrangement of measuring devices on a semitrailer motor vehicle having a tractive unit, a semitrailer, a fifth wheel fastened to the tractive unit, and a plate connected to the semitrailer and positioned intermediate said semitrailer and said fifth wheel, said measuring arrangement comprising:

means for measuring forces which arise between the semitrailer and the tractive unit; and said measuring means includes means for measuring at least one of acceleration, tractive and braking forces at said plate being disposed on said plate, said measuring means being disposed between said plate and the semitrailer.

4. An arrangement of measuring devices on a semitrailer motor vehicle having a tractive unit, a semitrailer, a fifth wheel fastened to the tractive unit, a plate connected to the semitrailer and positioned intermediate said semitrailer and said fifth wheel, and a coupling plate provided on said fifth wheel said measuring arrangement comprising:

means for measuring forces which arise between the semitrailer and the tractive unit; and said measuring means disposed on said plate for measuring the weight of the semitrailer between said plate and said coupling plate provided on the fifth wheel, wherein the fifth wheel includes a king pin fastened to the plate.

5. An arrangement of measuring devices on a semitrailer motor vehicle having a tractive unit, a semitrailer, a fifth wheel fastened to the tractive unit, and a plate connected to the semitrailer and positioned intermediate said semitrailer and said fifth wheel, said measuring arrangement comprising:

means for measuring forces which arise between the semitrailer and the tractive unit; and said measuring means being disposed on said plate between the semitrailer and the fifth wheel, wherein the fifth wheel includes a kingpin fastened to the plate.

* * * * *